United States Patent
Lake et al.

(10) Patent No.: US 8,044,957 B2
(45) Date of Patent: Oct. 25, 2011

(54) SUBDIVIDING GEOMETRY IMAGES IN GRAPHICS HARDWARE

(75) Inventors: Adam T. Lake, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/097,312

(22) Filed: Apr. 29, 2011

(65) Prior Publication Data

US 2011/0205230 A1    Aug. 25, 2011

Related U.S. Application Data

(62) Division of application No. 12/787,520, filed on May 26, 2010, now Pat. No. 7,956,860, which is a division of application No. 10/926,875, filed on Aug. 26, 2004, now Pat. No. 7,750,914.

(51) Int. Cl.
*G06T 17/00* (2006.01)
*G06T 15/30* (2011.01)
*G06T 17/20* (2006.01)

(52) U.S. Cl. .................. 345/428; 345/423

(58) Field of Classification Search .......... 345/428, 345/423
See application file for complete search history.

(56) References Cited

U.S. PATENT DOCUMENTS

| | | | |
|---|---|---|---|
| 6,747,644 B1* | 6/2004 | Deering | 345/420 |
| 7,071,936 B2* | 7/2006 | Hoppe et al. | 345/420 |
| 7,436,405 B2* | 10/2008 | Losasso Petterson et al. | 345/428 |

* cited by examiner

Primary Examiner — Ryan R Yang
(74) Attorney, Agent, or Firm — Trop, Pruner & Hu, P.C.

(57) ABSTRACT

A system may include a graphics memory, a data bus, a processor, and a vertex shader. The data bus may be operatively connected to the graphics memory. The processor may send vertex data to the graphics memory via the data bus. The vertex shader may read the vertex data from the graphics memory and may subdivide the vertex data into subdivided vertex data. The vertex shader may also write the subdivided vertex data to the graphics memory.

6 Claims, 4 Drawing Sheets

SUBDIVIDING GEOMETRY IMAGES IN GRAPHICS HARDWARE

CROSS-REFERENCE TO RELATED APPLICATIONS

This application is a divisional of U.S. patent application Ser. No. 12/787,520, filed on May 26, 2010 now U.S. Pat. No. 7,956,860, which is a divisional of U.S. patent application Ser. No. 10/926,875, filed on Aug. 26, 2004, which issued as U.S. Pat. No. 7,750,914.

BACKGROUND

Implementations of the claimed invention generally may relate to processing graphical images and, more particularly, to processing graphical images using geometry images.

FIG. 1 is a flow chart illustrating typical graphics processing 100. Geometry representing graphical images may be submitted to a graphics pipeline [act 110]. Such geometry typically may include triangles, but may include quadrilaterals or any other type of geometry. Vertex shaders may then process the geometry, performing such processing as transforming and lighting each polygon, determining colors for vertices, determining normals if necessary, etc. [act 120]. Vertex shaders typically include hardware that implements an instruction set to operate on data associated with vertices. Such data may include the vertex position, vertex normal, and per vertex texture coordinates. These values may also be used later by the shading hardware to interpolate across a polygon to create a shaded image.

Next, the polygons may be clipped to the screen in appropriate positions [act 130]. Pixel shaders may then shade each polygon [act 140]. Pixel shaders typically include hardware that execute a set of instructions on each fragment as it passes through the graphics pipeline before being rendered to the screen. Pixel and vertex shaders may have identical or different instruction sets. Additionally, the instruction sets they execute may be different than the instructions exposed to a programmer.

After shading, if a particular pixel is in front of any previously rendered pixels, it may be written to the frame buffer [act 150]. In some graphical engines, alpha blending may occur. Alpha blending is a mechanism to facilitate the implementation of partially transparent objects and typically may be realized through an additional channel to the color channels used in a traditional three-dimensional (3D) graphics pipeline.

Recently, a technique of representing the surface geometry of graphical images has been proposed that may have certain advantages. Such a technique may remesh an arbitrary graphical surface onto a completely regular structure called a "geometry image." The geometry image may capture the surface geometry of a graphical image as a two-dimensional (2D) array of quantized points. Surface signals, such as normals and/or colors, may be stored in similar 2D images using the same surface parameterization as the geometry image. Further discussion of geometry images may be found in, for example, Xianfeng Gu et al., "Geometry Images," SIGGRAPH 2002 Proceedings, pp. 355-361; and F. Losasso et al., "Smooth Geometry Images," Eurographics 2003, pp. 138-145 and 273. To better understand what a geometry image is and how it may represent a 3D graphical object, a brief explanation will be provided.

FIG. 2 illustrates formation of a geometry image 250 from a 3D model 210 (see, e.g., Hughes Hoppe, "Irregular To Completely Regular Meshing In Computer Graphics," International Meshing Roundtable 2002, September 2002). 3D model 210 may be conceptualized as a two-dimensional (2D) shape bent and warped in 3D space to form a 3D mesh. Model 210 may include such a mesh of geometric shapes (e.g., triangles, quadrilaterals, etc.) that are defined by vertices and edges between the vertices. The vertices in model 210 may have associated spatial coordinate values in a 3D coordinate system (e.g., [x,y,z] coordinates).

3D Model 210 may be cut along its edges to form a different (e.g., non-rabbit-shaped) 2D shape. Cut 220 illustrates one such cut. This different shape may be warped or parameterized using known techniques to form a regular shape 230. Regular shape 230 may include connected vertices from model 210 (e.g., illustrated as triangles), with the cut 220 being located at the outer edge(s) of shape 230. Thus, regular shape 230 retains both the [x,y,z] position values of the vertices in model 210, as well as the connection relationships between these vertices. It should be noted that although regular shape 230 is illustrated as a square, other types of regular shapes (e.g., circles, etc.) may also be used.

The polygons in regular shape 230 may be regularly sampled to generate sampled shape 240. Each sampled point in sampled shape 240 may be a new vertex that both retains a positional value (e.g., an [x,y,z] coordinate) and that is implicitly connected to other vertices in sampled image 240. That is, vertices in sampled image 240 may be connected be edges to other vertices to their top, bottom, left, and right sides by virtue of the regular sampling of regular shape 230.

Sampled image 240 may be converted into a red/green/blue (RGB) (or any other color space) color image by mapping the three-channel [x,y,z] coordinates of the vertices in sampled image 240 to the three-channel RGB space, [r,g,b] coordinates, to produce geometry image 250. Each pixel in geometry image 250 may represent a sampled vertex in model 210, with the red, green, and blue values of the pixel representing the [x,y,z] spatial position of the sampled vertex. The neighbor vertices of the corresponding sampled vertex in model 210 are determined by the neighboring pixels to a given pixel in geometry image 250. In other words, the neighbor vertices of model 210 are known by the neighbor pixels in geometry image 250, and the positional values of these vertices are known by the color values for pixels in geometry image 250.

Although geometry image 250 has been explained with regard to positional information, geometry images 250 may be generated for any information associated with the vertices of model 210. For example, normals, which are [x,y,z] vectors that point into space, may also be represented by a geometry image 250. Also, color values and/or texture coordinates may also be represented by geometry images 250. Representing models as images may allow one to use existing image processing algorithms, such as image compression algorithms.

Although it is possible to compress geometry images, such geometry images, even if compressed, may in some instances be sent to a graphics processor over a data bus. In some cases, the bandwidth of the data bus may limit the resolution and/or visual fidelity able to be displayed by the graphics processor from the geometry images.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 3:
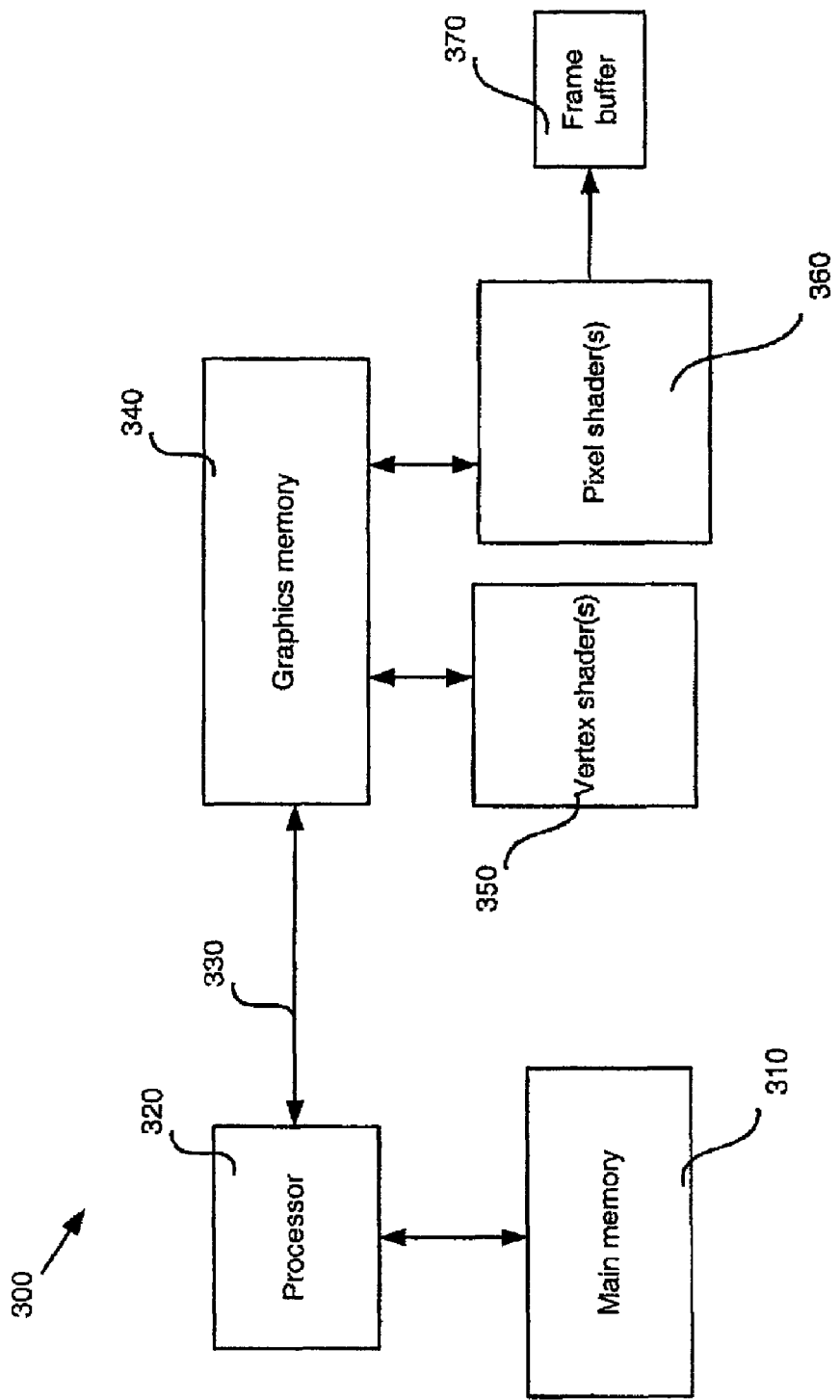
FIG. 3 illustrates an example system.

FIG. 3 illustrates an example system 300. System 300 may include a main memory 310, a processor 320, a data bus 330, a graphics memory 340, one or more vertex shaders 350, one or more pixel shaders 360, and a frame buffer 370. In some implementations, one or more of elements 340-370 may be included in a physically distinct graphics card that is connected to processor 320 via data bus 330. In some implementations, elements 340-370 may be located on a common circuit board (e.g., a motherboard, daughter card, etc.) with elements 310 and 320. In some implementations, one or more of elements 350 and 360 may be part of one portion (e.g., a core) of a device, and processor 320 may be include in another portion (e.g., another core) of the same device.

Main memory 310 may include a storage device to store geometry images. Main memory 310 may include a random access memory (RAM) device, such as a dynamic RAM (DRAM), double data rate RAM (DDR RAM), etc. Main memory 310 may store pre-computed geometry images and/or graphical data from which to compute geometry images.

Processor 320 may include a general-purpose processor, a specific-purpose processor, and/or logic configured for a specific purpose. Processor 320 may be arranged to distribute geometry images from main memory 310 to graphics memory 340 via data bus 330. Processor 320 may send the geometry images via data bus 330 under control of a program, such as a rendering, game, graphical creation, or other type of graphics-related program. In some implementations, processor 320 may compute the geometry images from other information in main memory 310 and store the geometry images in main memory 310. In some implementations, processor 320 may compress the geometry images (e.g., via JPEG 2000 or another lossless scheme) before transmission via data bus 330.

Data bus 330 may connect processor 320 to graphics memory 340. Data bus 330 may use a typical interconnect protocol, or may use a custom communication protocol. Data bus 330 may have an associated bandwidth that defines a maximum amount of data that it can transfer in a given time. In some implementations, the bandwidth of data bus 330 may limit the performance of other portions of system 300 (e.g., shaders 350 and/or 360). In some implementations, the bandwidth of data bus 330 may not limit the overall performance of system 300.

Graphics memory 340 may include a storage device to store geometry images. Graphics memory 340 may include a random access memory (RAM) device, such as a dynamic RAM (DRAM), double data rate RAM (DDR RAM), etc. Graphics memory 340 may receive and store geometry images from processor 320 and vertex shaders 350. In addition to storing geometry images via write operations, graphics memory 340 may provide such geometry images to vertex shaders 350 and pixel shaders 360 via read operations. For example, graphics memory 340 may store various "per-vertex" data associated with the geometry images. Such vertex data may include one or more of vertex positions, texture coordinates, color coordinates, or normal vectors.

Vertex shaders 350 may be arranged to read the vertex data from graphics memory 340 and to subdivide the vertex data to generate higher-resolution vertex data. Vertex shaders 350 may have a parallel architecture, and may have a larger instruction set than, for example, pixel shaders 360. Vertex shaders 350 may use various vertex generation programs and subdivision schemes to increase the resolution of the vertex data, as will be described further herein. Vertex shaders 350 may also write the higher-resolution vertex data to graphics memory 340.

Because of a relatively high-bandwidth access to graphics memory 340, vertex shaders 350 may write a relatively large amount of higher-resolution vertex data to graphics memory 340. Typical subdivision schemes may increase the amount of data in a geometry image by a factor of four. Vertex shaders 350 may be arranged to perform one or more levels of subdivision for a given geometry image, and once-subdivided vertex data stored in graphics memory 340, for example, may be used by vertex shaders 350 to generate a second level of subdivided data (e.g., at a higher/finer resolution) for storage in graphics memory 340.

Pixel shaders 360 may be arranged to read the subdivided vertex data from graphics memory 340 and prepare it for display. Pixel shaders 360 may have a higher bandwidth connection to graphics memory 340 than, for example, vertex shaders 350, and pixel shaders 360 may be able more limited in number of instructions and instruction set than vertex shaders 350. For example, pixel shaders 360 may be arranged to read the new, higher-resolution geometry images from graphics memory 340, rasterize the images, and send the rasterized pixel data to frame buffer 370. In some implementations, pixel shaders 360 may rasterize the new geometry images using the lower-resolution geometry images from processor 320 (which may remain in graphics memory 340) as display primitives.

Frame buffer 370 may be arranged to receive pixel data from pixel shaders 360 and buffer it, if necessary, prior to display. Frame buffer 370 may also output data to a display or display interface, possibly under control of a graphics processor (not shown).

Figure 4:
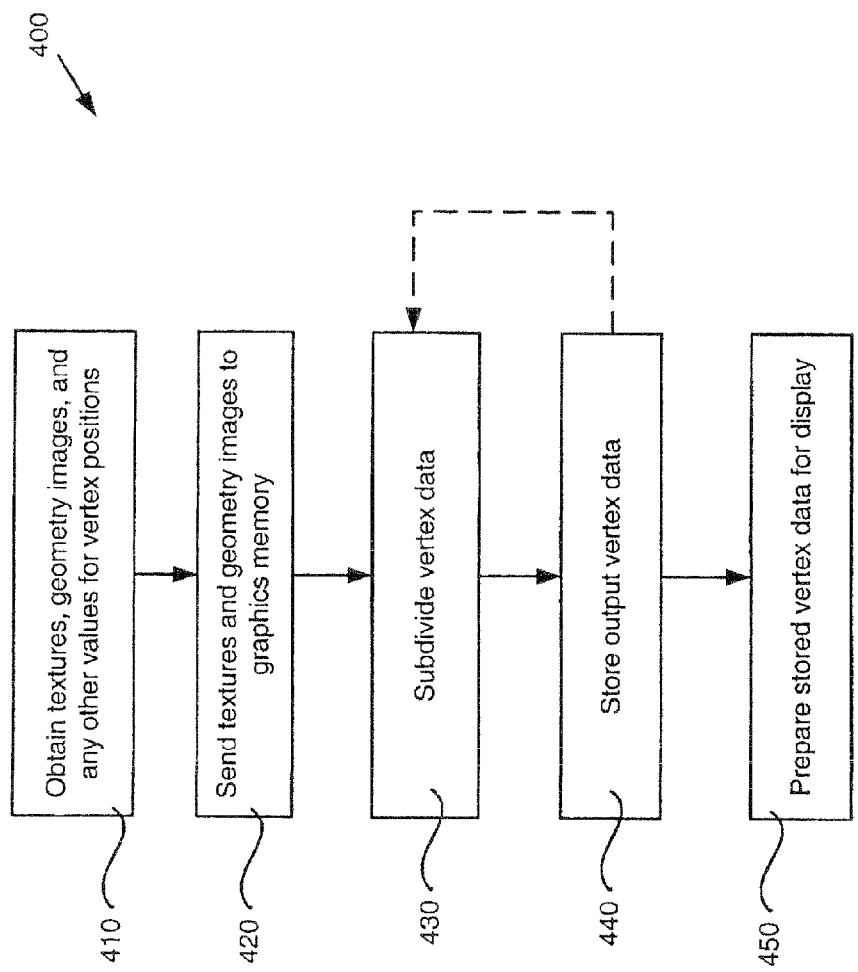
FIG. 4 is a flow chart illustrating a process of subdividing graphics data.

FIG. 4 is a flow chart illustrating a process 400 of subdividing graphics data. Although process 400 may be described with regard to system 300 for ease of explanation, the claimed invention is not necessarily limited in this regard.

Processing may begin with processor 320 obtaining textures, geometry images, and any other associated values for vertex positions in an image [act 410]. In some implementations, processor 320 may compute the values, and in some implementations processor 320 may read the values from main memory 310. In addition to obtaining a geometry image, processor 320 may also create one or more of a texture coordinate map and a color coordinate map. Detailed procedures for creating geometry images (e.g., cutting a mesh along edge paths and parameterizing the resulting chart into a square) may be found in, for example, Xianfeng Gu et al., "Geometry Images," SIGGRAPH 2002 Proceedings, pp. 355-361. Such texture map, geometry image, and/or color map may be implemented as arrays having specified widths and heights.

Figure 1:
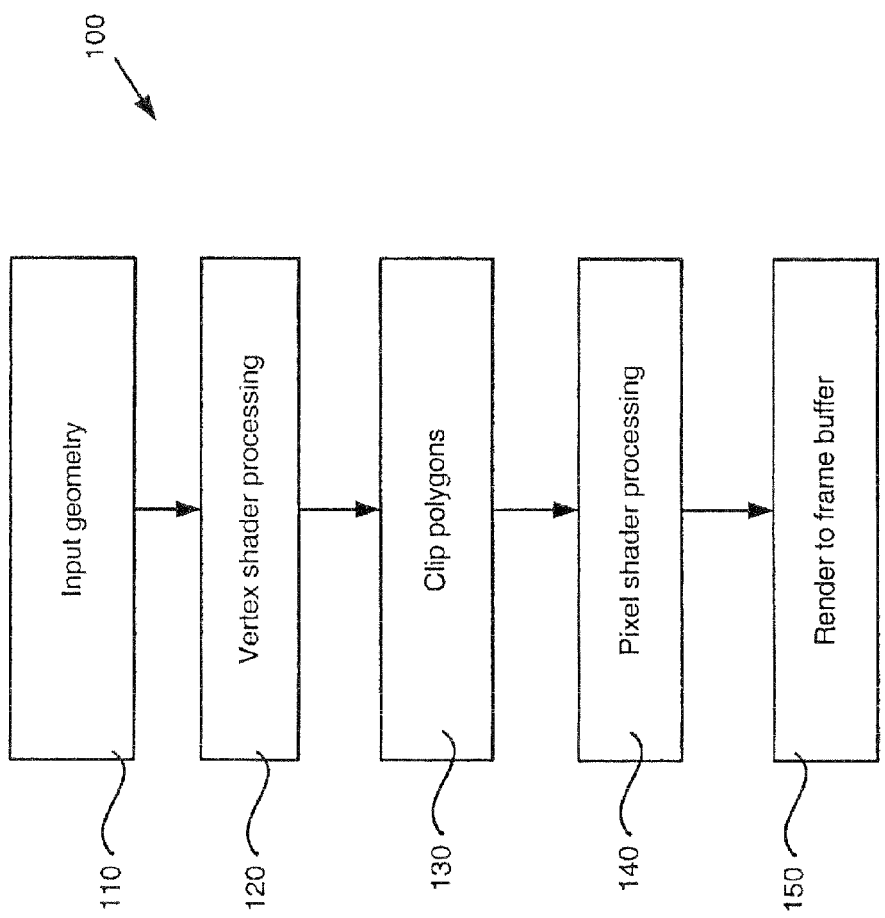
FIG. 1 is a flow chart illustrating typical graphics processing.
Figure 2:
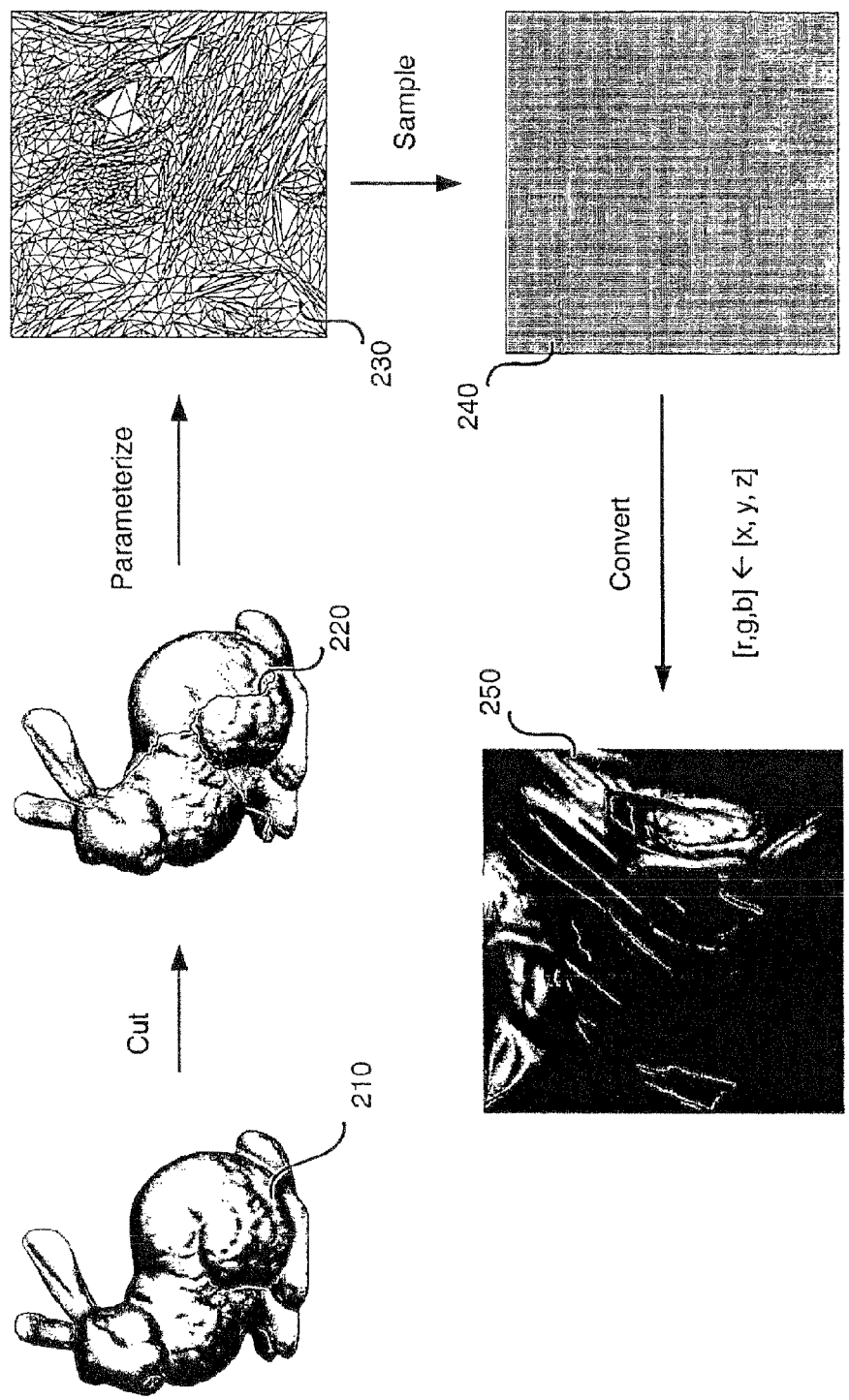
FIG. 2 illustrates formation of a geometry image.

Texture, color, and/or normal maps may be created in the same fashion as the vertex map in FIG. 2. For textures, tu and tv may be stored in the red and green channels respectively. Likewise, for color r, g, and b values may be stored into the r, g, and b values for the texture map. Because textures are normally just arrays of colors, both color and texture maps use r, g, and b. Finally, x, y, and z values of the normals may be stored into the r, g, and b channels of the texture map. It should be noted that such mapping need not be restricted to a 2D structure, such as an image. Rather, the techniques described herein may support textures, normals, and colors by consuming any number of channels that are mapped into r, g, b, and (if necessary) alpha. If more than 4 channels of vertex-related information or data are desired, additional texture maps may be used for this information. Thus, the technique described with regard to FIG. 2 may be used with somewhat arbitrary and/or complex vertex data.

Also in act 410, processor 320 may create placeholder arrays for the textures, geometry images and colors when subdivided one or more times. Such placeholder arrays may be sent over data bus 330 in shorthand form using minimal bandwidth to reserve space in graphics memory 340 for the subdivided textures, geometry images, etc. In some implementations, the placeholder arrays may be generated locally by vertex shaders 350 in response to a command from processor 320. In any event, the placeholder arrays may be initialized to zero and stored in graphics memory 340.

Processing may continue with processor 320 sending the textures, geometry images, and any other values (e.g., color coordinates and/or normal vectors) to graphics memory 340 via data bus 330 [act 420]. In some implementations, processor 320 may submit the textures, geometry images, and any other values to a graphics application programming interface (API), which may handle transporting the textures and geometry images to graphics memory 340. In some implementations, the textures, geometry images, etc. may be compressed (e.g., via a lossless scheme such as JPEG 2000) before transmission over data bus 330.

Vertex shaders 350 may read the stored textures, geometry images, and any other values (collectively "vertex data") from graphics memory 340 and may subdivide the vertex data [act 430]. As previously mentioned, subdivision of a two-dimensional image (e.g., a geometry image) may increase the resolution of the image by roughly four times. In some implementations, vertex shaders 350 may implement the subdivision using the Catmull-Clark technique outlined in Ed Catmull and Jim Clark, "Recursively Generated B-Spline Surfaces on Arbitrary Topological Meshes," Computer Aided Geometric Design, Vol. 10, Nov. 6, 1978.

Other subdivision techniques may be employed, however, by vertex shaders 350. In some implementations, vertex shaders 350 may subdivide the vertex data using the butterfly technique outlined in "Subdividing Reality: Employing Subdivision Surfaces for Real Time Scalable Photorealism," by Stephen Junkins, Game Developers Conference proceedings, 2000. In some implementations, vertex shaders 350 may subdivide the vertex data using the loop technique outlined in C. T. Loop, "Smooth Subdivision Surfaces Based on Triangles," M. S. Thesis, Department of Mathematics, University of Utah, August, 1987. In some implementations, vertex shaders 350 may subdivide the vertex data using the Doo-Sabin technique outlined in D. Doo and M. Sabin, "Behavior of Recursive Division Surfaces Near Extraordinary Points," Computer Aided Design, Vol. 10, Nov. 6, 1978.

Vertex shaders 350 may write the subdivided, output vertex data to graphics memory 340 [act 440]. In some implementations, vertex shaders 350 overwrite one or more placeholder arrays in graphics memory 340 with the output vertex data. In some implementations, vertex shaders 350 may create new structures in graphics memory 340 for the output vertex data as needed.

Depending on a number of levels of desired subdivision, vertex shaders 350 may repeat acts 430 and 440 one or more times, as illustrated by the dashed arrow in FIG. 4. For example, if more than one subdivision operation is desired (e.g., to produce a greater resolution), vertex shaders 350 may read and further subdivide once-subdivided (or twice-subdivided if repeating act 430 a second time) output vertex data stored in graphics memory 340 in a previous act 440. Because subdivision may depend on vertex data at the immediately preceding resolution (e.g., the output of the prior subdivision), in some implementations vertex shaders 350 may overwrite and/or delete vertex data of a higher resolution to free space in graphics memory 340. For example, when performing a second (or higher) level of subdivision, the original vertex data sent from processor 320 may be overwritten and/or deleted.

Other techniques may also be employed when subdividing to save space in graphics memory 340 and/or other resources of system 300. For example, space in graphics memory 340 may be saved by not subdividing texture, normal and/or color coordinates as fully as, for example, the associated geometry images. In such a case, pixel shaders 360 may just reference a lower level of subdivision (e.g., only once subdivided data for a twice or more subdivided resolution) and divide by 4 for each lookup. As one example, if generating and/or storing a 256.times.256 normal map along with a corresponding 256.times.256 geometry image is not desirable, a normal map from the 64.times.64 level of resolution may be used by pixel shaders 360 instead. For an entry at index (32,32) in the position array, position (8,8) in the 64.times.64 normal map may be referenced by pixel shaders 360 during their processing. Thus, pixel shaders 360 may use one or more maps of a lower resolution (e.g., a normal map) when formatting other vertex data (e.g., a geometry image or other structure) that has been subdivided to a higher resolution by vertex shaders 350.

In some implementations, an appropriate normal may be computed, and then the closest normal may be looked up in the old normal map. The resulting normal data may be stored in a normal map of any size. Other techniques may be used to avoid, for a given resolution, fully subdividing all graphical data in graphics memory 340.

Subdivision may not be desired in some areas (e.g., areas within a geometry image). For those areas, the existing geometry image, normal image, and/or texture maps may be left alone. For the other areas that are desirable to subdivide, a subdivision scheme may be employed (e.g., Catmull-Clark). For borders between the two regions (e.g., subdivided and not) some vertex information may be duplicated.

Another technique to save space in graphics memory 340 may be to compress the data stored therein (e.g., the original vertex data and/or the subdivided vertex data) via a lossless compression scheme. One such scheme that may be suitable for compressing, for example, subdivided geometry images may be JPEG 2000, which may achieve compression ratios of about 2.5 to 1. Data compression may be used instead of, or in addition to, other techniques for reducing the amount of data stored in graphics memory 340.

Processing may continue with pixel shaders 360 preparing the subdivided vertex data stored in graphics memory 340 for display [act 450]. Pixel shaders 360 may rasterize and/or otherwise format the stored vertex data (e.g., geometry images, color maps, etc.) for display. In some implementations, pixel shaders 360 may prepare the subdivided vertex data using one or more lower resolution sets of vertex data (e.g., original geometry images) as display primitives. Although not explicitly shown in FIG. 4, the formatted graphical images may then be displayed from frame buffer 370.

The above-described system and scheme of subdividing vertex data via vertex shaders 350 may in some implementations increase a visual fidelity/resolution of displayed data for a given bandwidth of data carried by data bus 330. For example, vertex data that uses most or substantially all of the bandwidth of data bus 330 may be subdivided by vertex shaders 350 to increase display resolution over what may otherwise be possible due to the bandwidth of data bus 330. In some implementations, such a subdivision scheme may facilitate producing a given visual fidelity/resolution using less bandwidth of data bus 330 than if subdivision was not performed. For example, the display resolution may remain the same as that in the case where no subdivision was performed, but subdivision allows the former case to use substantially less bandwidth of data bus 330 for the same resolution.

To further aid in understanding the above-described system 300 and process 400, an example will be presented. In this example, processor 320 may create or read from main memory 320 in act 410 three n.times.n (n being an integer, such as 8, 16, 32, etc.) arrays, G0, T0, and C0. G0 may be a geometry image. T0 may be a texture coordinate map, with each position containing corresponding texture coordinates. C0 may be a color coordinate cap, with each position containing corresponding red, green, and blue color values. G0, T0, and C0 may be at an original resolution (e.g., 8.times.8, 16.times.16, etc.).

Also in act 410, for each level of subdivision desired (e.g., two levels), processor 320 and/or vertex shaders 350 may create a placeholder array/map for each of G0, T0, and C0 at a respective subdivided resolution. For a first level of subdivision, G1, T1, and C1 may be created with a size/resolution of 4*n.times.4*n, because subdivision may increase size/resolution of an array/image by a factor of four. For a second level of subdivision, G2, T2, and C2 may be created with a size/resolution of 4*4*n.times.4*4*n (i.e., 16n.times.16n). For convenience, G1, T1, C1, G2, T2, and C2 may be initialized to zero.

In act 420, processor 320 may send structures G0, T0, C0, G1, T1, C1, G2, T2, and C2 to graphics memory 340 via data bus 330. In some implementations, such operation may be performed using a graphics API. This operation may initialize space in graphics memory 340 to be filled in later by vertex shader 350.

Vertex shaders 350 may then subdivide G0, T0, and C0 to generate first subdivided vertex data G1, T1, and C1 in act 430. For example, if the particular subdivision scheme employed is Catmull-Clark subdivision scheme, new face points for a face may be calculated by averaging old points defining the face. New edge points may be calculated by averaging midpoints of old edges with the average of the two new face points of the faces sharing an edge. New vertex points may be calculated by averaging $Q/n+(2*R)/n+(S*(n-3))/n$, where Q equals the average of new face points of all faces adjacent to old vertex point; R equals the average of midpoints of all old edges incident on old vertex point, and S is the old vertex point. Other subdivision schemes than Catmull-Clark may be used in some implementations.

As each set of points in G1, T1, and C1 is created, vertex shaders 350 may store the values in the corresponding placeholder structures in graphics memory 340 in act 440. When the first subdivision is sufficiently complete, vertex shaders 350 may further subdivide G1, T1, and C1 to generate second subdivided vertex data G2, T2, and C2 in act 430. Vertex shaders 350 may store the further subdivided values in the corresponding placeholder structures G2, T2, and C2 in graphics memory 340 in act 440. As previously explained, G1, T1, or C1 may not undergo a second level of subdivision in some implementations. Pixel shaders 360 may read the finally-subdivided vertex data (e.g., G2, T2, and C2 if all have been twice-subdivided) from graphics memory 340 and prepare it for display via frame buffer 370. In implementations where G0, T0, and C0 are not all subdivided twice, pixel shaders 360 may prepare G2 and one or more less-subdivided structures, such as T1 and/or C1, for display.

Although the above illustrative example includes a specific implementation, the claimed invention is not necessarily limited thereto. For example, the initial vertex data may include different graphical data than G0, T0, and C0, such as normal data. The number of subdivisions performed by vertex shaders 350 may be less than or greater than two. Similarly, a different subdivision scheme than Catmull-Clark may be used in some implementations.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the subdivision scheme herein has been described with regard to vertex shaders 350, in some implementations other graphics hardware may be used to implement subdivision. Such other hardware (e.g., other types of shaders, etc.) may be suitable if it has the ability to read vertex data from and write subdivided vertex data to graphics memory 340.

Further, the subdivision scheme described herein may be performed on an as-needed basis (e.g., substantially in real time) by vertex shaders 350 in some implementations, and it may be pre-computed by vertex shaders 350 in some implementations. Also, in some implementations, vertex shaders 350 may send the subdivided vertex data directly to pixel shaders 360, rather than first writing it to graphics memory 340.

Moreover, the acts in FIG. 4 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A method comprising:
reading vertex data having a first resolution from a memory;
reading normal data having a second resolution that is lower than the first resolution from the memory; and
preparing the vertex data for display using the normal data.

2. The method of claim 1, further comprising:
subdividing original vertex data having the second resolution into the vertex data having the first resolution; and
writing the vertex data having the first resolution to the memory.

3. The method of claim 1, wherein the preparing includes:
scaling an index into the vertex data having the first resolution by a ratio of the first and second resolutions to generate a corresponding index into the normal data having the second resolution.

4. An apparatus comprising:
a memory;
a first device to read vertex data having a first resolution from said memory and to read normal data having a second resolution that is lower than the first resolution from the memory; and
said first device to prepare the vertex data for display using the normal data.

5. The apparatus of claim 4, said first device to subdivide original vertex data having the second resolution into the vertex data having the first resolution and to write the vertex data having the first resolution to the memory.

6. The apparatus of claim 4, said first device to scale an index into the vertex data having the first resolution by a ratio of the first and second resolutions to generate a corresponding index into the normal data having the second resolution.

* * * * *